No. 792,098. PATENTED JUNE 13, 1905.
H. M. WILLIAMS.
PROCESS OF MAKING INGOTS FOR SEAMLESS GOLD PLATED WIRE.
APPLICATION FILED APR. 11, 1904.

WITNESSES,
C. T. Hannigan
Howard A. Lamprey

INVENTOR.
Herbert M. Williams
By Warren R. Perce
Attorney.

No. 792,098. Patented June 13, 1905.

UNITED STATES PATENT OFFICE.

HERBERT M. WILLIAMS, OF ATTLEBORO, MASSACHUSETTS.

PROCESS OF MAKING INGOTS FOR SEAMLESS GOLD-PLATED WIRE.

SPECIFICATION forming part of Letters Patent No. 792,098, dated June 13, 1905.

Application filed April 11, 1904. Serial No. 202,626.

*To all whom it may concern:*

Be it known that I, HERBERT M. WILLIAMS, a citizen of the United States, residing at Attleboro, in the county of Bristol and State of Massachusetts, have invented certain new and useful Improvements in Processes of Making Ingots for Seamless Gold-Plated Wire, of which the following is a specification, reference being had therein to the accompanying drawings.

Like letters indicate like parts.

Figure 1:
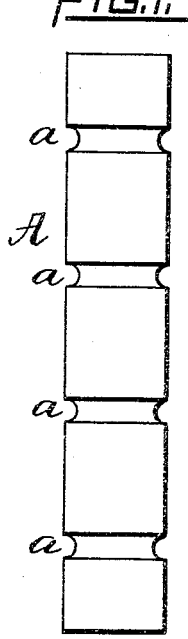
Figures 2, 6:
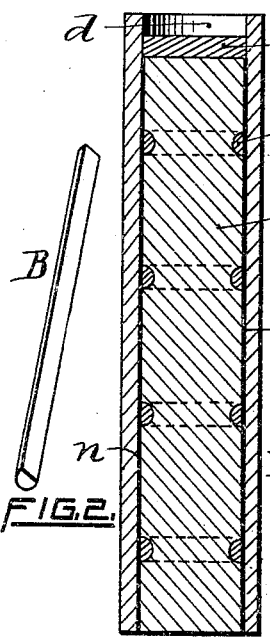
Figure 3:
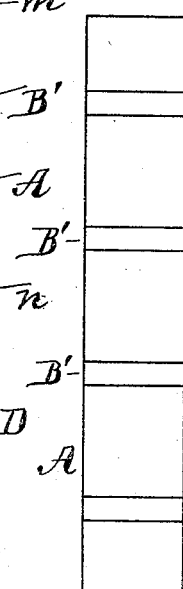
Figure 4:
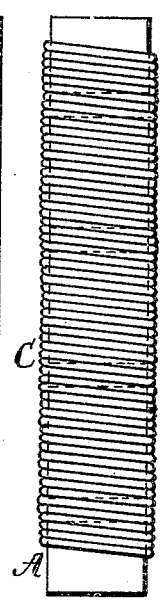
Figure 5:
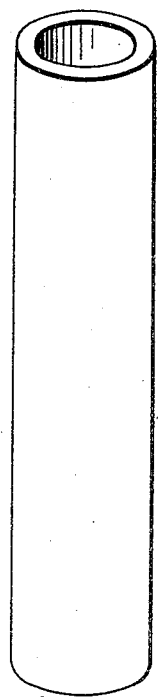
Figure 7:
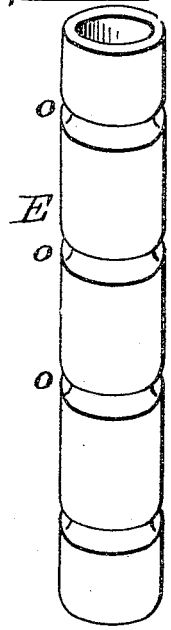
Figure 9:
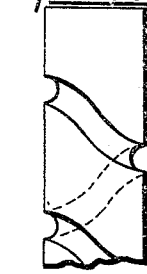
Figure 10:
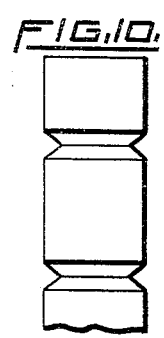
Figure 11:
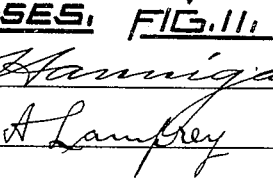
Figure 8:
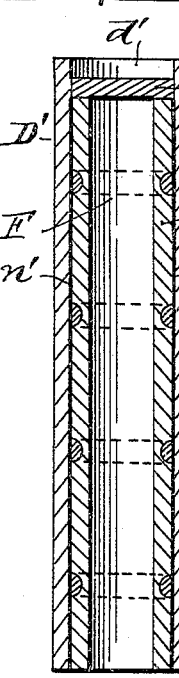
Figure 12:
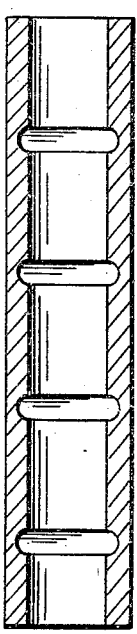
Figure 13:
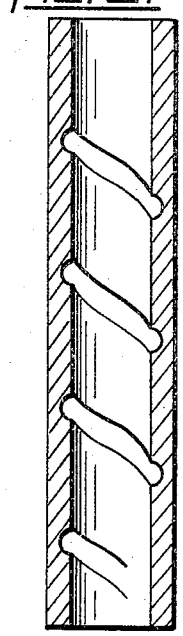

Figure 1 is a view in elevation of the cylindrical core of base metal constituting the central portion of my improved grooved ingot for the manufacture of seamless gold-plated wire. Fig. 2 is a perspective view of a small bar of solder used therewith. Fig. 3 is a view in elevation of said core of base metal with its grooves filled with rings of solder formed from bars, such as is shown in Fig. 2. Fig. 4 is a view in elevation of said core of base metal provided in its grooves with rings of solder, as shown in Fig. 3, and wound on its cylindrical surface with coils of iron wire. Fig. 5 is a perspective view of a solid seamless tube of gold. Fig. 6 is a view in diametrical longitudinal section of my improved ingot for the manufacture of seamless gold-plated wire. Fig. 7 is a perspective view of a tube of base metal made with grooves on the outer surface thereof. Fig. 8 is a view in diametrical longitudinal section of an ingot for the manufacture of seamless gold-plated hollow wire made according to my invention. Figs. 9, 10, and 11 represent modifications of my invention relating to the shape and location of the grooves and to the shape of the strip of solder to be inserted in said grooves. Figs. 12 and 13 show gold tubes having interior grooves and constitute modifications of said invention.

My invention relates to processes for making compound ingots used in the manufacture of seamless gold-plated wire; and it consists of the novel combination of the successive operations hereinafter described, and specifically set forth in the claims.

Seamless gold-plated wire as used in the jeweler's art consists of a seamless tube of gold and a solid or hollow core of base metal inserted in the gold tube and united thereto by solder. There are several methods of manufacturing seamless gold-plated wire; but one of the most common methods consists in forming a compound ingot, made up of said gold tube and the base-metal core soldered thereto of a considerable diameter (say one and one-half inches or other desirable diameter) and quite short, (say from eight to twelve inches,) and then swaging and drawing said ingot to the required size of wire. A difficulty in the manufacture of such compound ingots is experienced in the proper soldering of the gold tube to the base-metal core. Various methods of soldering these two parts together are known and used in the art. One of these methods consists in the use of a gold tube which is somewhat longer than the base-metal core, so that when the core is inserted in the tube one end of the tube extends beyond the end of the core, thus forming a circular socket or chamber at that end of the compound ingot. It has been common in this process to force the core into the tube or to contract the tube upon the core by drawing or otherwise, so as to secure a tight fit of the core in the tube, and then to place in said socket or chamber a proper quantity of loose solder. Then the whole is subjected to heat in a furnace, with the result that the solder is melted and works down between the tube and core, thus uniting the parts together and forming a very thin tubular layer of solder between them; but it is practically difficult to secure in this process a distribution of the solder throughout the entire extent of the contiguous surfaces, and unless the core and tube are everywhere soldered together the wire made from such ingots is imperfect and unsalable. There is also no uniformity of results, and it cannot be ascertained while the stock is in the form of an ingot whether or not the soldering has been perfectly or uniformly done, nor at what places the soldering is defective or insufficient. If the film of solder is not uniform and coextensive with the adjacent surfaces of the core and tube, the subsequent operations of reducing and drawing are liable to form blisters or to cause a tearing of the tube from the core. There are other methods of soldering the tube and core together; but it is unnecessary to describe them here, because they are well known in the art and do not concern this present invention; but the method which I have explained is the one upon which I have made an improvement, whereby the defects and difficulties heretofore found in practicing it are entirely overcome and a commercially practical and useful product is obtained.

Referring to the drawings, A represents a cylindrical core of base metal, having at intervals the circumferential grooves $a$ $a$, which, as best shown in Fig. 1, are half-round transversely.

B is a bar of solder made of the metallic ingredients commonly used for the purpose, said bar being plano-convex in cross section and the convex curvature being preferably one hundred and eighty degrees in extent, so that it exactly corresponds to the concave curvature of the grooves $a$ of the core A. The solder bar B is cut into sections or lengths of such size that when one piece or section of it is bent into a ring the ring can be inserted in one of the grooves $a$ of the core A and will exactly fit the same, the ends of said ring abutting each other, and the plane side of the bent bar being flush or even with the cylindrical surface of the core A. In Fig. 3 is shown a series of such solder rings (marked B') in position in the grooves $a$ of the core A, the outer surface of every ring B' being even or continuous with the cylindrical or exposed surface of the core A. The core A, before the solder rings B' are fused thereon, must be thoroughly cleaned in order to remove grease, scales, or foreign substances and then covered with borax or other flux. The solder rings B' are then put in position in the grooves $a$ $a$ of the core A, and a wire C (preferably iron) is wound around the core A and rings B in spiral coils, (preferably close coils,) as shown in Fig. 4. In this manner the solder rings B' are secured in accurate position in said grooves. This wound and ringed core is then placed in a sweat-box, oven, or furnace, being preferably supported in a vertical position upon a revolving base, and is exposed to the heat of a hydrocarbon flame or to other suitable heat. The result is that the solder is melted and fused upon the core A in the grooves $a$ $a$ thereof with the outer surface of each ring flush with the cylindrical surface of the core A. The wire C serves three purposes in this operation: it holds the solder ring in position before said ring is fused, it prevents any expansion or distortion of the outer surface of the rings or core, and it prevents any flow of the solder out of the grooves $a$ $a$. It is obvious, however, that this heating operation must be continued only for such a time as will enable the solder ring to fuse and unite with the core A in the grooves $a$ $a$ thereof. The wire C is unwound and removed from the core and rings as soon as they are sufficiently cooled to allow such manipulation. The compound core thus formed is smoothed off by sandpaper, emery, or by filing, as it is mounted and revolved in a lathe until the entire surface is smooth, uniform, and perfectly cleaned. Then said compound core is covered with borax or other flux. The gold tube D is then thoroughly cleaned all over its inner surface, and the boraxed compound core A B' is inserted in the gold tube D. This core is preferably of such diameter that it fits the bore of the tube D quite closely, but with a running or sliding fit, so that there is a very narrow annular space between the inner surface of the gold tube and the core A, with its rings B' fused thereon. The parts when thus assembled (as the bottom of the gold tube and the bottom of the core are in the same plane, but the gold tube is longer than the core) form a circular socket or chamber whose annular wall is said tube and whose bottom is the top or end of the core A. In this chamber is laid a circular disk of solder or loose chipped, granulated, or ground solder, as may be preferred. The compound ingot thus prepared is then put into the sweat-box, oven, or furnace, as before described, being preferably supported in a vertical position upon a revolving base, and is there subjected to a sufficient heat to fuse the solder, so uniting the core A and the tube D upon their adjacent surfaces. The solder when thus melted flows down into the annular space between the core and tube from each ring B', as well as from the loose solder in the chamber at the top. The loose solder in said chamber supplies the required amount to fill the annular space between the core and tube down to the uppermost solder ring B'. Said uppermost solder ring furnishes a supply sufficient to fill the annular space between the core and tube down to the next solder ring B', and so on, each ring B' furnishing enough solder for the space between it and the next lower ring, while the lowest ring B' provides solder enough to fill the space between the core and tube to the very bottom of the ingot.

Whereas in the old process hereinbefore described there is but one source of supply of solder for the entire length of the core and tube and the uneven expansion of the tube and core (because they are of dissimilar metals and the tube is not only more ductile and more easily fused than the base metal but also is most exposed to the heat) is apt to cause irregularities of shape and some distortion of surface, so that said annular space between the core and tube does not continue of uniform width, but may even be entirely closed up by the actual contact in some places of the adjacent surfaces. It is evident that the flow of the melted solder, as it depends entirely on gravity, is impeded or in some places entirely prevented. If the core fits the tube tightly, it may require a considerable time for the solder to make its way along the whole extent of these adjacent surfaces. In my improved method the solder rings B', placed at frequent intervals and at short spaces apart, constitute so many reservoirs or reinforcements of material, each fusing at the same time as the others. Therefore the solder from each ring has only a comparatively short distance through which it must work. The continuance of the heating operation is of much shorter duration, and there is consequently less distortion or irregular expansion.

In Fig. 6 I illustrate this compound ingot after the completion of the final operation. The chamber is shown at $d$. The loose solder in the chamber is designated as $m$. The solid black lines indicated at $n$ represent the thin film of solder which has worked down between the core A and the tube D throughout their extent of contiguity and has firmly united them together. This compound fused ingot is first swaged in a reducing-machine and then drawn on a draw-bench through a draw-board having apertures of graduated sizes in the manner well known in the art. The final product is a seamless gold-plated wire ready for the manufacture of jewelry.

Seamless gold-plated hollow wire is made in a similar manner except that instead of using a solid cylindrical rod of base metal provided with grooves (illustrated in Fig. 1) a tube of base metal E is used, having circumferential grooves $o$ formed on the outside thereof, as seen in Fig. 7. The compound ingot for the manufacture of said hollow wire is shown in Fig. 8, in which figure D' represents the gold tube, E the tube of base metal, $d'$ the chamber, $m'$ the solder in said chamber introduced loosely therein, F the solder rings in the grooves of the tube E, and $n'$ the thin film of solder in the annular space between the inner and outer tubes.

As the intervals between the solder rings are short and said rings all melt and flow at the same time, the depletion of each ring by the flowing out of a portion of the solder into the annular space next below between the gold tube and the core (or tube) of base metal is compensated by what flows down to take its place from the ring next above, and the outflow of solder from the uppermost groove resulting from the ring therein is compensated by the quantity melted down from the loose solder $m$ in the chamber $d$, so that there is no place throughout the entire annular space between the gold tube and the core (or tube) of base metal where they are not fully united by the solder.

I have shown in Figs. 1 and 7 the grooves as extending circumferentially around the core or base-metal tube and as being transversely half-round in shape. It is obvious, however, that the grooves may be spirally directed, as illustrated in Fig. 9, or may be longitudinally directed and need not be continuous, as pockets or cavities of any shape, size, and location which may be suitable for the purpose may be used with good results. Neither is it necessary to form the solder into plano-convex bars, as illustrated in Fig. 2, as bars of solder which are triangular in cross-section may be used, such as is shown in Fig. 11, in which case the groove should be V-shaped, as seen in Fig. 10. So bars which are rectangular in cross-section can be used in grooves of corresponding shape, and other modifications can be made as desired.

In Figs. 12 and 13 is shown a modification of this invention, in which, instead of forming grooves on the core, the grooves are formed on the interior surface of the gold tube. In such case the core used is cylindrical throughout. The solder bars are inserted in the grooves of the tube. In Fig. 12 the grooves of the tube are straight and at right angles to the bore of the tube, and in this construction the rings of solder are inserted in a manner similar to that already described, the plane surface of each ring being flush or even with the inner surface of the tube. In Fig. 13 the groove is shown as spirally directed. In such a construction only one long bar of solder is used and being inserted at one end thereof into one end of the spiral groove of the tube is by a screw-like movement pushed throughout the whole length of said groove. In case of the interior grooving of the tube the solder bars have a sufficient resilience to enable them to hold their place without the preliminary flushing operation in the sweat-box, oven, or furnace.

Instead of using close coils of wire, as shown in Fig. 4, any coarse coiling of wire or other fastening means can be used to hold the solder bars in position during the first (or flushing) operation, as no great amount of heat is necessary therefor, and, indeed, in some cases this winding operation may be dispensed with.

As in the drawing process, whereby the ingot is reduced to seamless gold-plated wire for jewelry manufacture, the gold tube D and the base-metal rod A are greatly stretched and elongated, and unless they are very firmly united by solder throughout the entire extent of their contiguous surfaces the gold tube or shell is liable to be stripped off from the base-metal core, more or less, or to become separated therefrom, thus making the compound wire unfit for jeweler's use, it is very important to secure the two together as absolutely as possible. In the art as heretofore practiced there has been merely a thin tube of solder formed by the fusing operation, which tube is practically of uniform thickness and has no holding contact with the gold tube or the base-metal core, except superficially along the contiguous surfaces. By my construction I provide additional holding means, and by the circumferential grooving of the surface of the base-metal rod or core and the formation of circumferential ridges of solder on the inner surface of the solder-tube, which ridges extend into said grooves and are fused therein in position, the liability of stripping off the gold tube in the drawing operation is prevented.

I claim as a novel and useful invention and desire to secure by Letters Patent—

1. The improved process of making compound ingots for seamless gold-plated wire herein described, consisting of the following steps: cleaning the interior surface of a gold tube; forming peripheral grooves in a cylindrical bar of base metal whose length is less than that of the gold tube; then covering the surface of said base-metal bar with a suitable flux; then placing in the grooves of the base-metal bar strips of solder fitting in said grooves with the outer surface of said strips flush and continuous with the surface of said base-metal bar; then winding said base-metal bar and solder strips thereon with a coil of iron wire; then subjecting said base-metal bar, solder strips and wire coil so in contact and while said bar is supported in a vertical position to a sufficient heat to fuse said solder strips to the base-metal bar in the grooves of said bar; then removing said coil of wire; then cleaning and smoothing the exposed surface of said base-metal bar and of the solder strips fused thereon; then covering said base-metal bar and the solder strips fused thereon with a suitable flux on the exposed surfaces thereof; then loosely inserting said base-metal bar with the solder strips fused thereon into the bore of the gold tube so that the bottom of said bar and the bottom of said tube are flush with each other thus forming a chamber at the opposite end of said bar and of said tube; then placing solder loosely in said chamber while said bar and tube are supported in a vertical position; then subjecting said tube and said bar with the solder strips fused thereon while in said position to a sufficient heat to melt said solder and to cause it to flow into and fill the annular space between said bar and tube thus uniting said bar and tube together throughout the whole extent of their contiguous surfaces, substantially as specified.

2. The improved process of making compound ingots for seamless gold-plated wire herein described, consisting of the following steps: cleaning the interior surface of a gold tube; forming peripheral grooves in a cylindrical bar of base metal whose length is less than that of the gold tube; then covering the surface of said bar with a suitable flux; then placing in the grooves of said bar strips of solder fitting in said grooves with the outer surface of said strips flush and continuous with the surface of said base-metal bar; then subjecting said bar with the solder strips therein while said bar is supported in a vertical position to a sufficient heat to fuse said solder strips to said bar in the grooves of said bar; then cleaning and smoothing the exposed surface of said bar and of the solder strips fused thereon; then covering with a suitable flux the exposed surfaces of said bar and solder strips; then loosely inserting said bar with the solder strips fused thereon into the bore of the gold tube so that the bottom of said bar and the bottom of said tube are flush with each other thus forming a chamber at the opposite end of said bar and of said tube; then placing solder loosely in said chamber while said bar and tube are supported in a vertical position; then subjecting said tube and said bar with the solder strips fused therein while in said position to a sufficient heat to melt said solder and to cause it to flow into and fill the annular space between said bar and tube thus uniting said bar and tube together throughout the whole extent of their contiguous surfaces, substantially as specified.

In testimony whereof I affix my signature in presence of two witnesses.

HERBERT M. WILLIAMS.

Witnesses:
THOMAS F. HUGHES,
HOWARD A. LAMPREY.